(12) United States Patent
Singh et al.

(10) Patent No.: US 12,124,869 B1
(45) Date of Patent: Oct. 22, 2024

(54) SYSTEM AND METHOD TO AUTOMATE MIGRATION OF ONE OR MORE RESOURCES TO A CLOUD

(71) Applicant: Onix Networking Corp., New York, NY (US)

(72) Inventors: Sanjay Singh, Lawrence Township, NJ (US); Patrick Schablitzki, Corte Madera, CA (US); Ramnish Singh, Sammamish, WA (US); Jay Jambotkar, Redmond, WA (US); Anantha Balasubramanian, Bangalore (IN); Balaji Ramakrishnan, Hyderabad (IN); Rajesh Kannan, Bangalore (IN)

(73) Assignee: Onix Networking Corp., NY (US)

( * ) Notice: Subject to any disclaimer, the term of this patent is extended or adjusted under 35 U.S.C. 154(b) by 0 days.

(21) Appl. No.: 18/633,574

(22) Filed: Apr. 12, 2024

(51) Int. Cl.
*G06F 9/455* (2018.01)
(52) U.S. Cl.
CPC ............ *G06F 9/45558* (2013.01); *G06F 2009/45562* (2013.01); *G06F 2009/4557* (2013.01); *G06F 2009/45583* (2013.01); *G06F 2009/45587* (2013.01)
(58) Field of Classification Search
None
See application file for complete search history.

(56) References Cited

U.S. PATENT DOCUMENTS

| | | | |
|---|---|---|---|
| 10,896,160 B2 | 1/2021 | Denyer et al. | |
| 2021/0014303 A1* | 1/2021 | Guim Bernat | H04L 41/5051 |
| 2021/0044976 A1* | 2/2021 | Avetisov | G06F 21/64 |
| 2021/0133234 A1 | 5/2021 | Bedadala et al. | |
| 2022/0004428 A1 | 1/2022 | Sun et al. | |
| 2022/0206832 A1* | 6/2022 | Berry | G06F 9/45558 |
| 2023/0196237 A1 | 6/2023 | Ratnapuri | |
| 2024/0086190 A1* | 3/2024 | Kwatra | G06F 8/60 |

* cited by examiner

*Primary Examiner* — Wynuel S Aquino
(74) *Attorney, Agent, or Firm* — Jason C. Cameron (57) ABSTRACT

A system to automate migration of one or more resources to a cloud is disclosed. The system includes a processing subsystem including a data acquisition module to acquire information. The processing subsystem includes a landing zone creation module to apply security details, and compliance details on virtual machines, storage, and networking resources allocated. The processing subsystem includes a storage migration module to configure cloud storage to migrate data from the source environment to the cloud. The processing subsystem also includes a network configuration module to establish secure communication between the source environment and the cloud. The processing subsystem also includes a data migration module to transfer the data from the source environment to the cloud. The processing subsystem includes a server migration module to migrate second servers to the cloud. The processing subsystem includes an application migration module to deploy applications to the cloud.

20 Claims, 6 Drawing Sheets

SYSTEM AND METHOD TO AUTOMATE MIGRATION OF ONE OR MORE RESOURCES TO A CLOUD

FIELD OF INVENTION

Embodiments of the present disclosure relate to a field of data migration and more particularly to a system and a method to automate migration of one or more resources to a cloud.

BACKGROUND

Migration of data and applications from an existing infrastructure to the cloud is being carried out in different migration waves to reduce downtime and data loss. The migration waves are prepared by analyzing several parameters, including infrastructure inventory, application logs, application configurations, database inventory, database logs, security and compliance reports and backup configuration reports. The infrastructure inventory ensures all hardware is accounted for, while the application logs, the application configurations, and the database inventory guide migration strategies, with security and compliance reports informing secure cloud implementation and backup configuration reports providing data integrity assurance during the migration waves.

Currently, the migration waves are planned manually, which requires significant time for the migration, thereby increasing the downtime and cost associated. Manually preparing the migration waves may affect data security, data accuracy, and application compatibility, along with causing network overloading, data loss, licensing and compliance problems.

Hence, there is a need for an improved system and method to automate migration of one or more resources to a cloud to address the aforementioned issue(s).

BRIEF DESCRIPTION

In accordance with an embodiment of the present disclosure, a system to automate migration of one or more resources to a cloud is provided. The system includes a processing subsystem hosted on a first server and configured to execute on a first network to control bidirectional communications among a plurality of modules. The processing subsystem includes a data acquisition module operatively coupled to an integrated database. The data acquisition module is configured to acquire a plurality of information including a migration wave plan, a migration cutover plan, a database migration plan, one or more security details, one or more compliance details, and a data migration plan. The processing subsystem also includes a landing zone creation module operatively coupled to the data acquisition module. The landing zone creation module is configured to parse the migration wave plan and the migration cutover plan to identify one or more landing zone requirements, and one or more requirements of the cloud. The landing zone creation module is also configured to allocate one or more virtual machines, storage, and one or more networking resources based on one or more infrastructure requirements derived using the one or more landing zone requirements and the one or more requirements of the cloud. The landing zone creation module is further configured to apply one or more security details, and one or more compliance details on each of the one or more virtual machines, the storage, and the one or more networking resources upon allocating the one or more virtual machines, the storage, and the one or more networking resources. The processing subsystem also includes a storage migration module operatively coupled to the landing zone creation module. The storage migration module is configured to analyze storage configuration of a source environment to identify a plurality of parameters; upon applying the one or more security details. The storage migration module is also configured to configure storage of the cloud based on the plurality of parameters to migrate data from the source environment to the cloud. The processing subsystem also includes a network configuration module operatively coupled to the storage migration module. The network configuration module is configured to map one or more network configurations of the source environment to a second network associated with the cloud upon configuring the storage of the cloud. The network configuration module is also configured to establish secure communication between the source environment and the cloud upon mapping the one or more network configurations. The processing subsystem also includes a data migration module operatively coupled to the network configuration module. The data migration module is configured to analyze the database migration plan to identify one or more data dependencies upon establishing secure communication. The data migration module is also configured to generate a data migration plan based on the one or more data dependencies identified and the migration wave plan. The data migration module is further configured to transfer the data from the source environment to the cloud based on the data migration plan generated. The processing subsystem also includes a server migration module operatively coupled to the data migration module. The server migration module is configured to identify one or more second servers and the one or more corresponding configurations of the one or more second servers from the migration wave plan. The server migration module is also configured to create one or more machine images of the one or more corresponding second servers based on the one or more configurations. The server migration module is also configured to migrate the one or more corresponding second servers to the cloud using the one or more machine images created. The processing subsystem also includes an application migration module operatively coupled to the server migration module. The application migration module is configured to identify one or more dependencies between one or more applications present in the source environment from the migration cutover plan. The application migration module is configured to generate a deployment plan for the one or more applications based on the one or more dependencies identified. The application migration module is also configured to deploy the one or more applications to the cloud based on the deployment plan generated, thereby automating the migration of the one or more resources to the cloud.

In accordance with another embodiment of the present disclosure, a method to automate migration of one or more resources to a cloud is provided. The method includes acquiring, by a data acquisition module, a plurality of information including a migration wave plan, a migration cutover plan, a database migration plan, one or more security details, one or more compliance details, and a data migration plan. The method also includes parsing, by a landing zone creation module, the migration wave plan and the migration cutover plan to identify one or more landing zone requirements, and one or more requirements of the cloud. The method also includes allocating, by the landing zone creation module, one or more virtual machines, storage, and one or more networking resources based on one or more infrastructure requirements derived using the one or more landing zone requirements and the one or more requirements of the cloud. The method also includes applying, by the landing zone creation module, one or more security details, and one or more compliance details on each of the one or more virtual machines, the storage, and the one or more networking resources upon allocating the one or more virtual machines, the storage, and the one or more networking resources. The method also includes analyzing, by a storage migration module, storage configuration of a source environment to identify a plurality of parameters; upon applying the one or more security details. The method also includes configuring, by the storage migration module, storage of the cloud based on the plurality of parameters to migrate data from the source environment to the cloud. The method also includes mapping, by a network configuration module, one or more network configurations of the source environment to a second network associated with the cloud upon configuring the storage of the cloud. The method also includes establishing, by the network configuration module, secure communication between the source environment and the cloud upon mapping the one or more network configurations. The method also includes analyzing, by a data migration module, the database migration plan to identify one or more data dependencies upon establishing secure communication. The method also includes generating, by the data migration module, a data migration plan based on the one or more data dependencies identified and the migration wave plan. The method also includes transferring, by the data migration module, the data from the source environment to the cloud based on the data migration plan generated. The method also includes identifying, by the server migration module, one or more second servers and the one or more corresponding configurations of the one or more second servers from the migration wave plan. The method also includes creating, by the server migration module, one or more machine images of the one or more corresponding second servers based on the one or more configurations. The method also includes migrating, by the server migration module, the one or more corresponding second servers to the cloud using the one or more machine images created. The method also includes identifying, by the application migration module, one or more dependencies between one or more applications present in the source environment from the migration cutover plan. The method also includes generating, by the application migration module, a deployment plan for the one or more applications based on the one or more dependencies identified. The method also includes deploying, by the application migration module, the one or more applications to the cloud based on the deployment plan generated, thereby automating the migration of the one or more resource to the cloud.

In accordance with another embodiment of the present disclosure, a non-transitory computer-readable medium storing a computer program that, when executed by a processor, causes the processor to perform a method to automate migration of one or more resources to a cloud is provided. The method includes acquiring, by a data acquisition module, a plurality of information including a migration wave plan, a migration cutover plan, a database migration plan, one or more security details, one or more compliance details, and a data migration plan. The method also includes parsing, by a landing zone creation module, the migration wave plan and the migration cutover plan to identify one or more landing zone requirements, and one or more requirements of the cloud. The method also includes allocating, by the landing zone creation module, one or more virtual machines, storage, and one or more networking resources based on one or more infrastructure requirements derived using the one or more landing zone requirements and the one or more requirements of the cloud. The method also includes applying, by the landing zone creation module, one or more security details, and one or more compliance details on each of the one or more virtual machines, the storage, and the one or more networking resources upon allocating the one or more virtual machines, the storage, and the one or more networking resources. The method also includes analyzing, by a storage migration module, storage configuration of a source environment to identify a plurality of parameters; upon applying the one or more security details. The method also includes configuring, by the storage migration module, storage of the cloud based on the plurality of parameters to migrate data from the source environment to the cloud. The method also includes mapping, by a network configuration module, one or more network configurations of the source environment to a second network associated with the cloud upon configuring the storage of the cloud. The method also includes establishing, by the network configuration module, secure communication between the source environment and the cloud upon mapping the one or more network configurations. The method also includes analyzing, by a data migration module, the database migration plan to identify one or more data dependencies upon establishing secure communication. The method also includes generating, by the data migration module, a data migration plan based on the one or more data dependencies identified and the migration wave plan. The method also includes transferring, by the data migration module, the data from the source environment to the cloud based on the data migration plan generated. The method also includes identifying, by the server migration module, one or more second servers and the one or more corresponding configurations of the one or more second servers from the migration wave plan. The method also includes creating, by the server migration module, one or more machine images of the one or more corresponding second servers based on the one or more configurations. The method also includes migrating, by the server migration module, the one or more corresponding second servers to the cloud using the one or more machine images created. The method also includes identifying, by the application migration module, one or more dependencies between one or more applications present in the source environment from the migration cutover plan. The method also includes generating, by the application migration module, a deployment plan for the one or more applications based on the one or more dependencies identified. The method also includes deploying, by the application migration module, the one or more applications to the cloud based on the deployment plan generated, thereby automating the migration of the one or more resource to the cloud.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation on the scope of disclosure is thus intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method to automate migration of one or more resources to a cloud. The system includes a processing subsystem hosted on a first server and configured to execute on a first network to control bidirectional communications among a plurality of modules. The processing subsystem includes a data acquisition module operatively coupled to an integrated database. The data acquisition module is configured to acquire a plurality of information including a migration wave plan, a migration cutover plan, a database migration plan, one or more security details, one or more compliance details, and a data migration plan. The processing subsystem also includes a landing zone creation module operatively coupled to the data acquisition module. The landing zone creation module is configured to parse the migration wave plan and the migration cutover plan to identify one or more landing zone requirements, and one or more requirements of the cloud. The landing zone creation module is also configured to allocate one or more virtual machines, storage, and one or more networking resources based on one or more infrastructure requirements derived using the one or more landing zone requirements and the one or more requirements of the cloud. The landing zone creation module is further configured to apply one or more security details, and one or more compliance details on each of the one or more virtual machines, the storage, and the one or more networking resources upon allocating the one or more virtual machines, the storage, and the one or more networking resources. The processing subsystem also includes a storage migration module operatively coupled to the landing zone creation module. The storage migration module is configured to analyze storage configuration of a source environment to identify a plurality of parameters; upon applying the one or more security details. The storage migration module is also configured to configure storage of the cloud based on the plurality of parameters to migrate data from the source environment to the cloud. The processing subsystem also includes a network configuration module operatively coupled to the storage migration module. The network configuration module is configured to map one or more network configurations of the source environment to a second network associated with the cloud upon configuring the storage of the cloud. The network configuration module is also configured to establish secure communication between the source environment and the cloud upon mapping the one or more network configurations. The processing subsystem also includes a data migration module operatively coupled to the network configuration module. The data migration module is configured to analyze the database migration plan to identify one or more data dependencies upon establishing secure communication. The data migration module is also configured to generate a data migration plan based on the one or more data dependencies identified and the migration wave plan. The data migration module is further configured to transfer the data from the source environment to the cloud based on the data migration plan generated. The processing subsystem also includes a server migration module operatively coupled to the data migration module. The server migration module is configured to identify one or more second servers and the one or more corresponding configurations of the one or more second servers from the migration wave plan. The server migration module is also configured to create one or more machine images of the one or more corresponding second servers based on the one or more configurations. The server migration module is also configured to migrate the one or more corresponding second servers to the cloud using the one or more machine images created. The processing subsystem also includes an application migration module operatively coupled to the server migration module. The application migration module is configured to identify one or more dependencies between one or more applications present in the source environment from the migration cutover plan. The application migration module is configured to generate a deployment plan for the one or more applications based on the one or more dependencies identified. The application migration module is also configured to deploy the one or more applications to the cloud based on the deployment plan generated, thereby automating the migration of the one or more resources to the cloud.

Figure 1:
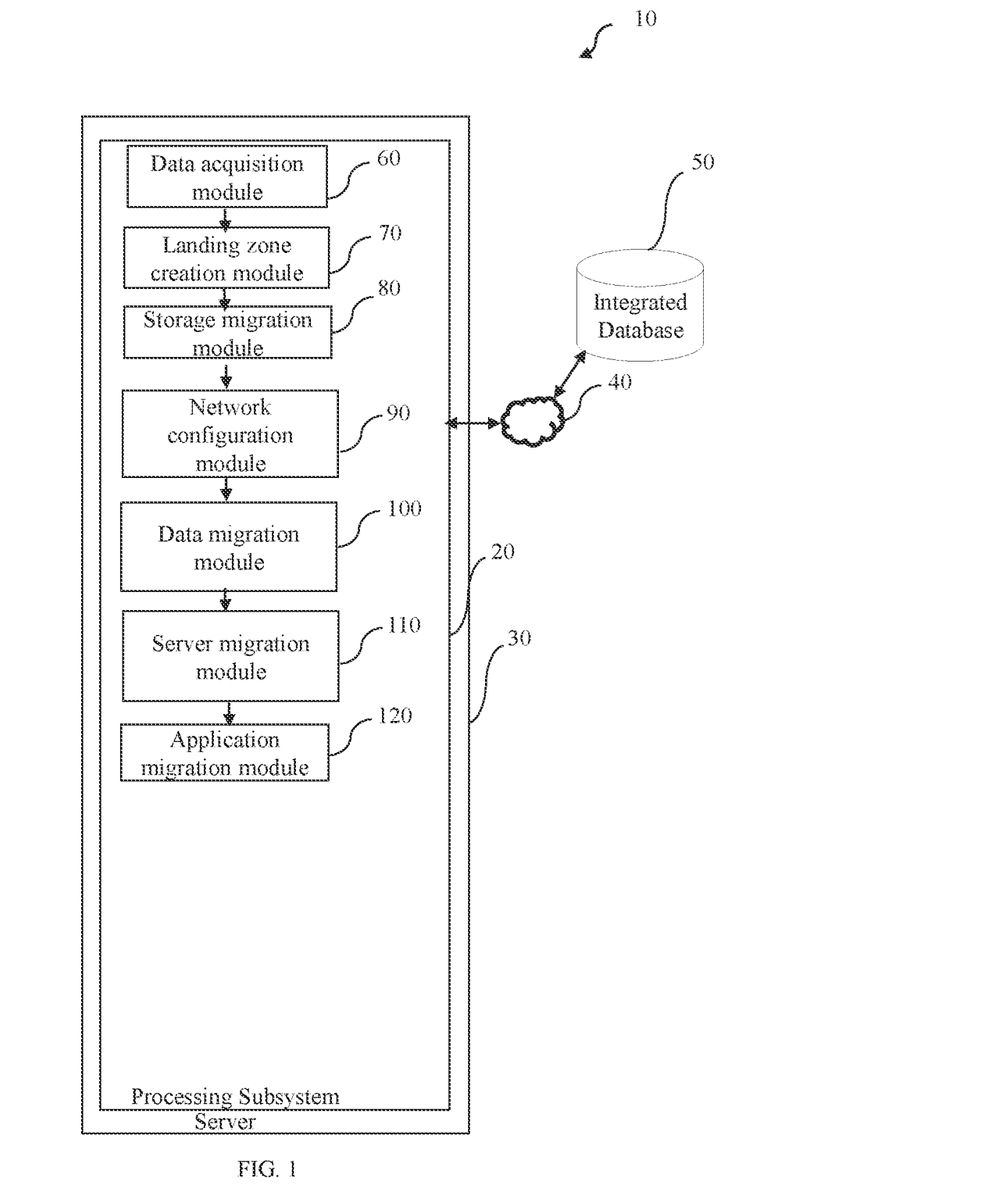
FIG. 1 is a block diagram representation of a system to automate migration of one or more resources to a cloud in accordance with an embodiment of the present disclosure.

FIG. 1 is a block diagram representation of a system 10 to automate migration of one or more resources to a cloud in accordance with an embodiment of the present disclosure. The system 10 includes a processing subsystem 20 hosted on a server 30 and configured to execute on a network 40 to control bidirectional communications among a plurality of modules. In one embodiment, the processing subsystem 20 may be configured to execute the plurality of modules parallelly. Further, in one embodiment, the server 30 may be a cloud-based server. In another embodiment, server 30 may be a local server. In one example, network 40 may be a private or public local area network (LAN) or wide area network (WAN), such as the Internet.

Further, in another embodiment, the network 40 may include both wired and wireless communications according to one or more standards and/or via one or more transport mediums. Furthermore, in one example, the network 40 may include wireless communications according to one of the 802.11 or Bluetooth specification sets, or another standard or proprietary wireless communication protocol. In yet another embodiment, the network may also include communications over a terrestrial cellular network, including, a GSM (global system for mobile communications), CDMA (code division multiple access), and/or EDGE (enhanced data for global evolution) network. In some embodiments, the integrated database may include a structured query language database. In a specific embodiment, the integrated database may include a non-structured query language database. In one embodiment, the integrated database may include a columnar database.

Furthermore, the processing subsystem 20 includes a data acquisition module 60 operatively coupled to an integrated database 50. In some embodiments, the integrated database 50 may include a structured query language database. In a specific embodiment, the integrated database 50 may include a non-structured query language database. In one embodiment, the integrated database 50 may include a columnar database. In one embodiment, the one or more resources may include one or more applications, one or more second servers, and data. The data acquisition module 60 is configured to acquire a plurality of information including a migration wave plan, a migration cutover plan, a database migration plan, one or more security details, one or more compliance details, and a data migration plan.

Additionally, as used herein, the migration wave plan may be defined as a phased approach for moving the one or more applications, and the data from on-premises infrastructure or one cloud environment to another. As used herein, the migration cutover plan may be defined as procedures to be followed during the final phase of the migration, known as the cutover phase. The cutover phase is the period when transition from an old environment to a new environment takes place. As used herein, the database migration plan may be defined as the phased strategy for moving databases from an on-premises environment to another. In one embodiment, the one or more security details may include data encryption, identity and access management, network security, security group configurations, logging and monitoring, incident response plan, compliance and regulatory considerations, data residency and sovereignty, vulnerability management, multi factor authentication, third party security and the like.

Moreover, in some embodiments, the one or more compliance details may include, data protection regulations, industry-specific compliance, data residency and sovereignty, security standards, service level agreements (SLAs), audit and reporting requirements, legal and jurisdictional considerations, incident response and reporting, identity and access management (IAM), encryption standards, change management, business continuity and disaster recovery, vendor risk management and the like. As used herein, the data migration plan may be defined as a phased approach for moving the data from the on-premises infrastructure or one cloud environment to another.

Further, the processing subsystem 20 includes a landing zone creation module 70 operatively coupled to the data acquisition module 60. The landing zone creation module 70 is configured to parse the migration wave plan and the migration cutover plan to identify one or more landing zone requirements, and one or more requirements of the cloud. In one embodiment, the cloud may include a private cloud, a public cloud, and a hybrid cloud. The landing zone creation module 70 is also configured to allocate one or more virtual machines, storage, and one or more networking resources based on one or more infrastructure requirements derived using the one or more landing zone requirements and the one or more requirements of the cloud.

Furthermore, in one embodiment, the one or more landing zone requirements may include one or more application dependencies, one or more performance requirements, one or more security requirements, one or more compliance requirements, one or more scalability requirements, network architecture, one or more identity requirements, one or more access management requirements, one or more monitoring requirements, one or more logging requirements, one or more documentation requirements and one or more compliance reporting requirements.

Moreover, in some embodiments the one or more requirements of the cloud may include scalability, security, compliance, availability, disaster recovery, performance optimization, data consistency, data synchronization, network connectivity, resource provisioning automation, data mapping, dependency analysis, deployment automation, testing, documentation, and compliance reporting. In one embodiment, the one or more infrastructure requirements may include networking resources, scalability, compliance and security, data migration, cloud region and availability zones, resource allocation policies, documentation, monitoring and logging.

Additionally, in a specific embodiment, the one or more networking resources comprises virtual private cloud, subnet, load balancer, firewall, virtual private network, direct connect, route tables, network security groups, domain name system, content delivery network, public IP addresses, private link, gateway services, network monitoring and logging. The landing zone creation module 70 is further configured to apply one or more security details, and one or more compliance details on each of the one or more virtual machines, the storage, and the one or more networking resources upon allocating the one or more virtual machines, the storage, and the one or more networking resources.

Also, for example, consider a scenario in which a source environment includes an application A, an application B, a database C and a database D. Application A depends upon the database C and the application depends on the database D. The server hosting the application A and the database C may be occupied during 9 am-6 pm due to business hours spanning between 9 am and 6 pm. The landing zone creation module 70 may parse the migration wave plan and the migration cutover plan for the application A and the application B to identify dependency between the application A and the application B along with performance of the cloud. The landing zone creation module 70 may further allocate the one or more virtual machines and the storage in the cloud for the application A and the application B based on the dependency between the application A and the application B and an availability of the cloud. The landing zone creation module 70 may further apply the one or more security details, and one or more compliance details on each of the one or more virtual machines, and the storage upon allocating the same.

Further, the processing subsystem 20 includes a storage migration module 80 operatively coupled to the landing zone creation module 70. The storage migration module 80 is configured to analyze storage configuration of a source environment to identify a plurality of parameters upon applying the one or more security details. In one embodiment, the plurality of parameters may include storage type, one or more performance requirements, and one or more data access patterns. The storage migration module 80 is also configured to configure storage of the cloud based on the plurality of parameters to migrate data from the source environment to the cloud. In continuation with the ongoing example, the storage migration module 80 may analyze the storage configuration of database C and database D to identify the data access patterns, and the storage type. Consequently, the storage migration module 80 may configure the storage of the cloud based on the data access patterns, and the storage type identified.

Furthermore, the processing subsystem 20 also includes a network configuration module 90 operatively coupled to the storage migration module 80. The network configuration module 90 is configured to map one or more network configurations of the source environment to a second network associated with the cloud upon configuring the storage of the cloud. The network configuration module 90 is also configured to establish secure communication between the source environment and the cloud upon mapping the one or more network configurations. In continuation with the ongoing example, the network configuration module 90 may map the one or more network configurations of the source environment in which the application A and the application B are functioning to the cloud to establish the secure communication between the source environment and the cloud.

Moreover, the processing subsystem 20 includes a data migration module 100 operatively coupled to the network configuration module 90. The data migration module 100 is configured to analyze the database migration plan to identify one or more data dependencies upon establishing the secure communication. The data migration module 100 is also configured to generate a data migration plan based on the one or more data dependencies identified and the migration wave plan. The data migration module 100 is further configured to transfer the data from the source environment to the cloud based on the data migration plan generated. In continuation with the ongoing example, the data migration module 100 may analyze the dependencies of application A and application B with respect to the associated databases to generate the data migration plan. The data migration module 100 may further transfer the data from the source environment to the cloud based on the migration plan generated.

Additionally, the processing subsystem 20 also includes a server migration module 110 operatively coupled to the data migration module 100. The server migration module 110 is configured to identify one or more second servers and the one or more corresponding configurations of the one or more second servers from the migration wave plan. The server migration module 110 is also configured to create one or more machine images of the one or more corresponding second servers based on the one or more corresponding configurations. The server migration module 110 is also configured to migrate the one or more corresponding second servers to the cloud using the one or more machine images created.

Also, in continuation with the ongoing example, the server migration module 110 may identify one or more second servers and the one or more corresponding configurations of the one or more second servers associated with application A and application B from the migration wave plan. The server migration module 110 may further create one or more machine images of the one or more corresponding second servers based on the one or more corresponding configurations. The server migration module 110 may migrate the one or more corresponding second servers to the cloud using the one or more machine images created.

Further, the processing subsystem 20 also includes an application migration module 120 operatively coupled to the server migration module 110. The application migration module 120 is configured to identify one or more dependencies between one or more applications present in the source environment from the migration cutover plan. The application migration module 120 is configured to generate a deployment plan for the one or more applications based on the one or more dependencies identified. The application migration module 120 is also configured to deploy the one or more applications to the cloud based on the deployment plan generated, thereby automating the migration of the one or more resource to the cloud.

Furthermore, in continuation with the ongoing example, the application migration module 120 may identify one or more dependencies between application A and application B from the migration cutover plan. The application migration module 120 may generate a deployment plan for the application A and the application B based on the one or more dependencies identified. The application migration module 120 may deploy application A and application B to the cloud based on the deployment plan generated, thereby automating the migration of one or more resources to the cloud.

Figure 2:
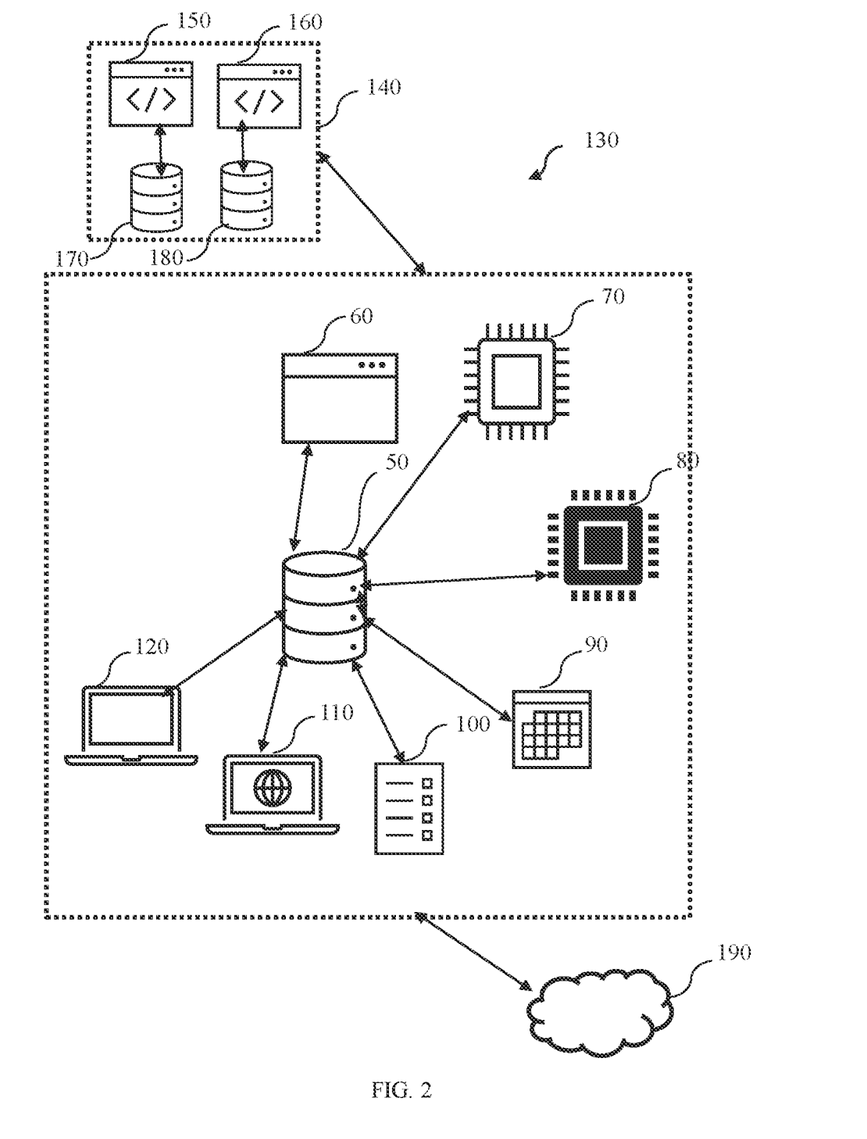
FIG. 2 is a block diagram representation of one embodiment of the system of FIG. 1 in accordance with an embodiment of the present disclosure.

FIG. 2 is a schematic representation of an exemplary embodiment 130 of the system 10 of FIG. 1 in accordance with an embodiment of the present disclosure. For example, consider a scenario in which a source environment 140 includes an application W 150, an application X 160, a database Y 170 and a database Z 180. The Application W 150 depends upon the database Y 170 and the application depends on the database Z 180. The server hosting the application W 150 and the database Y 170 may be occupied during 9 am-6 pm due to business hours spanning between 9 am and 6 pm. The landing zone creation module 70 may parse the migration wave plan and the migration cutover plan for the application W 150 and the application X 160 to identify dependency between the application W 150 and the application X 160 along with performance of the cloud 190. The landing zone creation module 70 may further allocate the one or more virtual machines and the storage in the cloud 190 for the application W 150 and the application X 160 based on the dependency between the application W 150 and the application X 160 and an availability of the cloud 190. The landing zone creation module 70 may further apply the one or more security details, and one or more compliance details on each of the one or more virtual machines, and the storage upon allocating the same.

Further, the storage migration module 80 may analyze the storage configuration of the database Y 170 and the database Z 180 to identify the data access patterns, and the storage type. Consequently, the storage migration module 80 may configure the storage of the cloud 190 based on the data access patterns, and the storage type identified. The network configuration module 90 may map the one or more network configurations of the source environment 140 in which the application W 150 and the application X 160 are functioning to the cloud 190 to establish the secure communication between the source environment 140 and the cloud 190. The data migration module 100 may analyze the dependencies of the application W 150 and the application X 160 with respect to the associated databases to generate the data migration plan. The data migration module 100 may further transfer the data from the source environment 140 to the cloud 190 based on the migration plan generated.

Furthermore, the server migration module 110 may identify one or more second servers and the one or more corresponding configurations of the one or more second servers associated with the application W 150 and the application X 160 from the migration wave plan. The server migration module 110 may further create one or more machine images of the one or more corresponding second servers based on the one or more corresponding configurations. The server migration module 110 may migrate the one or more corresponding second servers to the cloud 190 using the one or more machine images created. The application migration module 120 may identify one or more dependencies between the application W 150 and the application X 160 from the migration cutover plan. The application migration module 120 may generate a deployment plan for the application W 150 and the application X 160 based on the one or more dependencies identified. The application migration module 120 may deploy the application W 150 and the application X 160 to the cloud 190 based on the deployment plan generated, thereby automating the migration of the one or more resource to the cloud 190.

Figure 3:
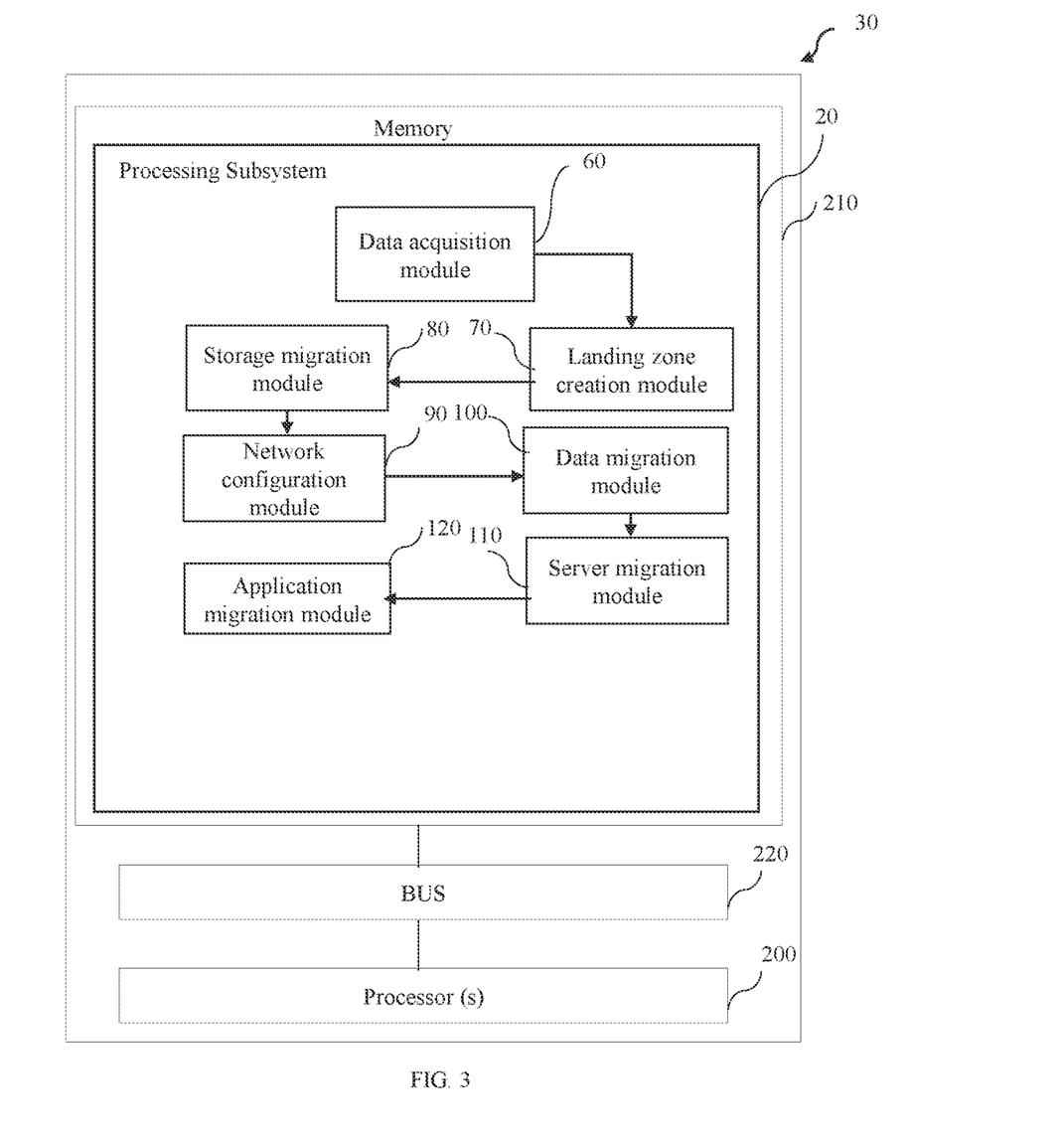
FIG. 3 is a schematic representation of an exemplary embodiment of the system of FIG. 1, in accordance with an embodiment of the present disclosure.

FIG. 3 is a block diagram of a computer or a server 30 in accordance with an embodiment of the present disclosure. The server 30 includes processor(s) 200, and memory 210 operatively coupled to the bus 220. The processor(s) 200, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of an executable program which instructs the processor to perform the method steps illustrated in FIG. 1. The memory 210 is substantially similar to the system 10 of FIG. 1. The memory 210 has the following subsystems: the processing subsystem 20 including the data acquisition module 60, the landing zone creation module 70, the storage migration module 80, the network migration module, the data migration module 100, the server migration module 110 and the application migration module 120. The plurality of modules of the processing subsystem 20 performs the functions as stated in FIG. 1 and FIG. 2. The bus 220 as used herein refers to the internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus, and the like.

The processing subsystem 20 includes a data acquisition module 60 operatively coupled to an integrated database 50. The data acquisition module 60 is configured to acquire a plurality of information including a migration wave plan, a migration cutover plan, a database migration plan, one or more security details, one or more compliance details, and a data migration plan. The processing subsystem 20 also includes a landing zone creation module 70 operatively coupled to the data acquisition module 60. The landing zone creation module 70 is configured to parse the migration wave plan and the migration cutover plan to identify one or more landing zone requirements, and one or more requirements of the cloud. The landing zone creation module 70 is also configured to allocate one or more virtual machines, storage, and one or more networking resources based on one or more infrastructure requirements derived using the one or more landing zone requirements and the one or more requirements of the cloud. The landing zone creation module 70 is further configured to apply one or more security details, and one or more compliance details on each of the one or more virtual machines, the storage, and the one or more networking resources upon allocating the one or more virtual machines, the storage, and the one or more networking resources. The processing subsystem 20 also includes a storage migration module 80 operatively coupled to the landing zone creation module 70. The storage migration module 80 is configured to analyze storage configuration of a source environment to identify a plurality of parameters; upon applying the one or more security details. The storage migration module 80 is also configured to configure storage of the cloud based on the plurality of parameters to migrate data from the source environment to the cloud. The processing subsystem 20 also includes a network configuration module 90 operatively coupled to the storage migration module 80. The network configuration module 90 is configured to map one or more network configurations of the source environment to a second network associated with the cloud upon configuring the storage of the cloud. The network configuration module 90 is also configured to establish secure communication between the source environment and the cloud upon mapping the one or more network configurations. The processing subsystem 20 also includes a data migration module 100 operatively coupled to the network configuration module 90. The data migration module 100 is configured to analyze the database migration plan to identify one or more data dependencies upon establishing secure communication. The data migration module 100 is also configured to generate a data migration plan based on the one or more data dependencies identified and the migration wave plan. The data migration module 100 is further configured to transfer the data from the source environment to the cloud based on the data migration plan generated. The processing subsystem 20 also includes a server migration module 110 operatively coupled to the data migration module 100. The server migration module 110 is configured to identify one or more second servers and the one or more corresponding configurations of the one or more second servers from the migration wave plan. The server migration module 110 is also configured to create one or more machine images of the one or more corresponding second servers based on the one or more configurations. The server migration module 110 is also configured to migrate the one or more corresponding second servers to the cloud using the one or more machine images created. The processing subsystem 20 also includes an application migration module 120 operatively coupled to the server migration module 110. The application migration module 120 is configured to identify one or more dependencies between one or more applications present in the source environment from the migration cutover plan. The application migration module 120 is configured to generate a deployment plan for the one or more applications based on the one or more dependencies identified. The application migration module 120 is also configured to deploy the one or more applications to the cloud based on the deployment plan generated, thereby automating the migration of the one or more resource to the cloud.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented along with program modules, including functions, procedures, data structures, and application programs, for performing tasks, or defining abstract data types or low-level hardware contexts. Executable program stored on any of the above-mentioned storage media may be executable by the processor(s) 200.

Figure 4A:
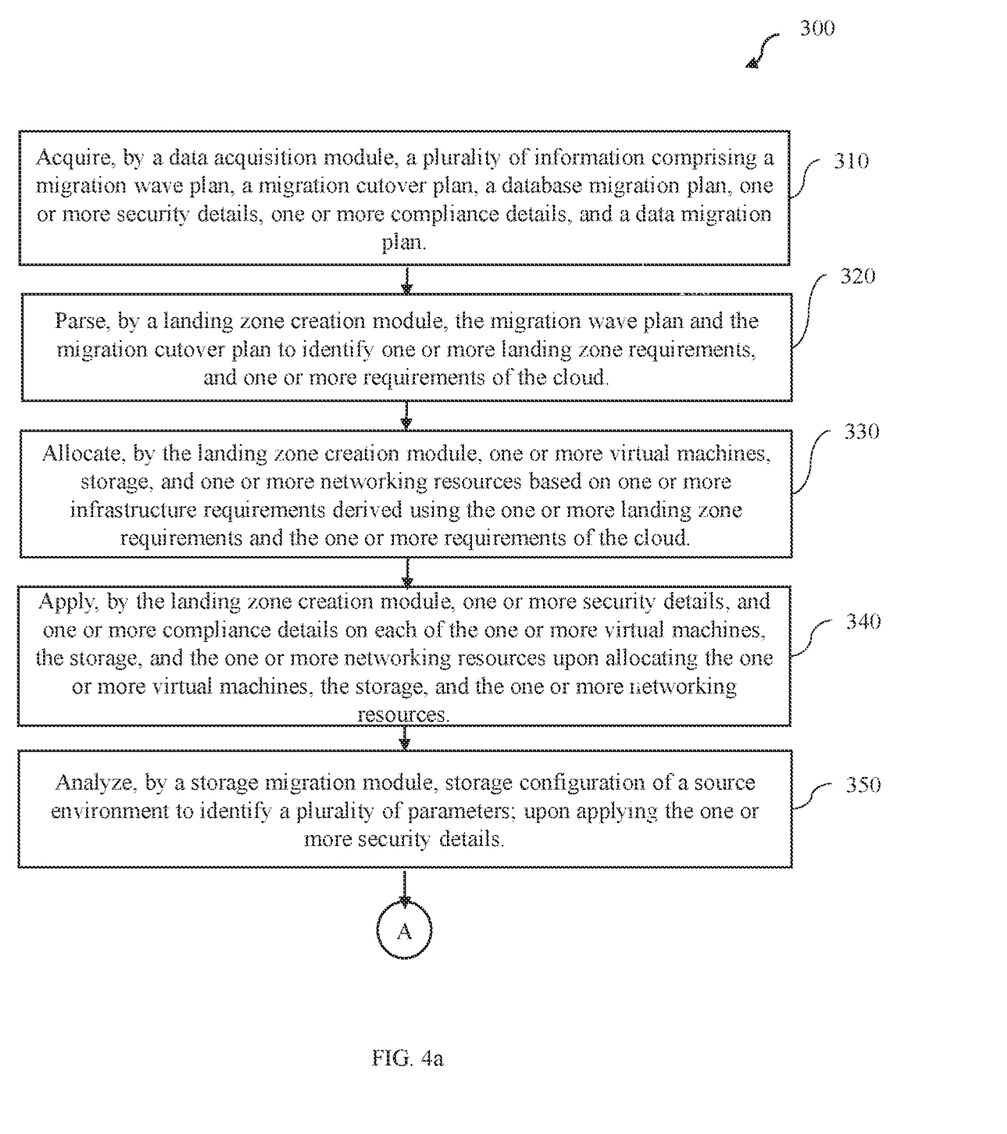
FIG. 4a is a flow chart representing the steps involved in a method to automate migration of one or more resources to a cloud in accordance with an embodiment of the present disclosure.
Figure 4B:
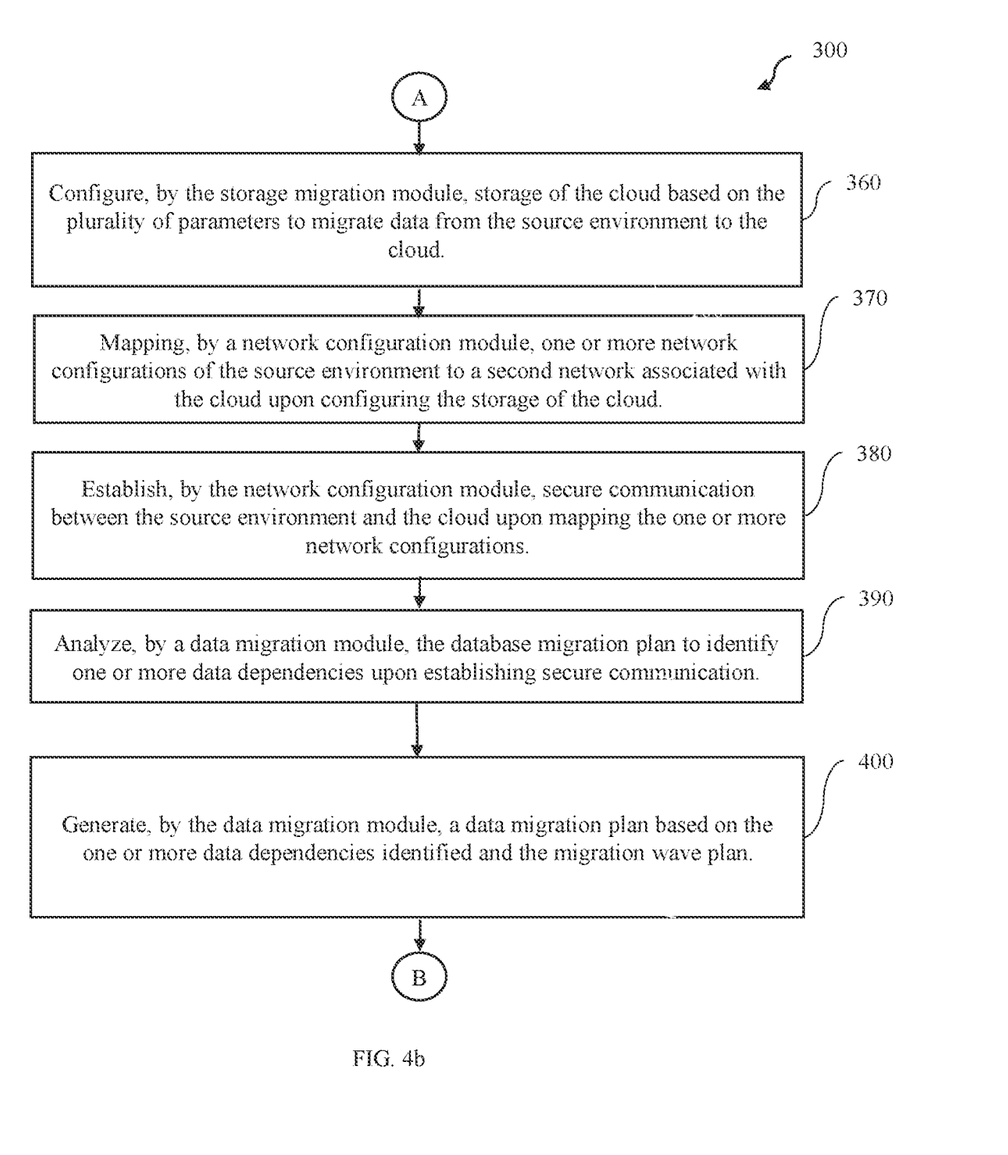
FIG. 4b is a flow chart representing the continued steps involved in a method of FIG. 4a, in accordance with an embodiment of the present disclosure.
Figure 4C:
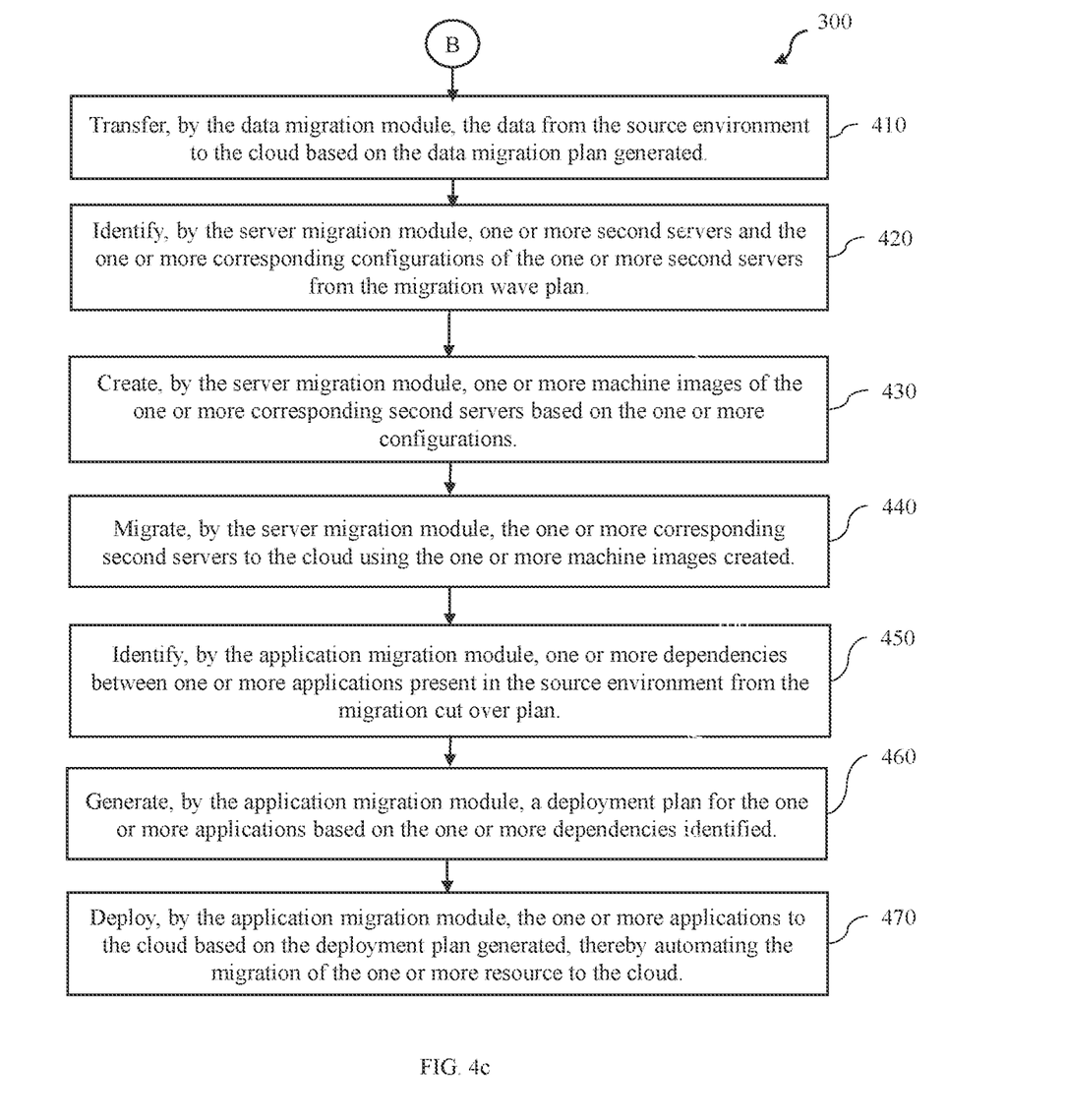
FIG. 4c is a flow chart representing the continued steps involved in a method of FIG. 4b, in accordance with an embodiment of the present disclosure.

FIGS. 4a, 4b and 4c is a flow chart representing the steps involved in a method 300 to automate migration of one or more resources to a cloud in accordance with an embodiment of the present disclosure. The method 300 includes acquiring a plurality of information comprising a migration wave plan, a migration cutover plan, a database migration plan, one or more security details, one or more compliance details, and a data migration plan in step 310. In one embodiment, includes acquiring a plurality of information comprising a migration wave plan, a migration cutover plan, a database migration plan, one or more security details, one or more compliance details, and a data migration plan includes acquiring a plurality of information comprising a migration wave plan, a migration cutover plan, a database migration plan, one or more security details, one or more compliance details, and a data migration plan by a data acquisition module. In one embodiment, the one or more resources may include one or more applications, the one or more second servers, and the data.

In one embodiment, the one or more security details may include data encryption, identity and access management, network security, security group configurations, logging and monitoring, incident response plan, compliance and regulatory considerations, data residency and sovereignty, vulnerability management, multi factor authentication, third party security and the like. In some embodiments, the one or more compliance details may include, data protection regulations, industry-specific compliance, data residency and sovereignty, security standards, service level agreements (SLAs), audit and reporting requirements, legal and jurisdictional considerations, incident response and reporting, identity and access management (IAM), encryption standards, change management, business continuity and disaster recovery, vendor risk management and the like.

The method 300 also includes parsing the migration wave plan and the migration cutover plan to identify one or more landing zone requirements, and one or more requirements of the cloud in step 320. In one embodiment, parsing the migration wave plan and the migration cutover plan to identify one or more landing zone requirements, and one or more requirements of the cloud includes parsing the migration wave plan and the migration cutover plan to identify one or more landing zone requirements, and one or more requirements of the cloud by a landing zone creation module.

The method 300 includes allocating one or more virtual machines, storage, and one or more networking resources based on one or more infrastructure requirements derived using the one or more landing zone requirements and the one or more requirements of the cloud in step 330. In one embodiment, allocating one or more virtual machines, storage, and one or more networking resources based on one or more infrastructure requirements derived using the one or more landing zone requirements and the one or more requirements of the cloud includes allocating one or more virtual machines, storage, and one or more networking resources based on one or more infrastructure requirements derived using the one or more landing zone requirements and the one or more requirements of the cloud by the landing zone creation module.

In one embodiment, the cloud may include a private cloud, a public cloud, and a hybrid cloud. The landing zone creation module is also configured to allocate one or more virtual machines, storage, and one or more networking resources based on one or more infrastructure requirements derived using the one or more landing zone requirements and the one or more requirements of the cloud. In one embodiment, the one or more landing zone requirements may include one or more application dependencies, one or more performance requirements, one or more security requirements, one or more compliance requirements, one or more scalability requirements, network architecture, one or more identity requirements, one or more access management requirements, one or more monitoring requirements, one or more logging requirements, one or more documentation requirements and one or more compliance reporting requirements. In some embodiments the one or more requirements of the cloud may include scalability, security, compliance, availability, disaster recovery, performance optimization, data consistency, data synchronization, network connectivity, resource provisioning automation, data mapping, dependency analysis, deployment automation, testing, documentation, and compliance reporting. In one embodiment, the one or more infrastructure requirements may include networking resources, scalability, compliance and security, data migration, cloud region and availability zones, resource allocation policies, documentation, monitoring and logging. In a specific embodiment, the one or more networking resources comprises virtual private cloud, subnet, load balancer, firewall, virtual private network, direct connect, route tables, network security groups, domain name system, content delivery network, public IP addresses, private link, gateway services, network monitoring and logging.

The method 300 also includes applying one or more security details, and one or more compliance details on each of the one or more virtual machines, the storage, and the one or more networking resources upon allocating the one or more virtual machines, the storage, and the one or more networking resources in step 340. In one embodiment, applying one or more security details, and one or more compliance details on each of the one or more virtual machines, the storage, and the one or more networking resources upon allocating the one or more virtual machines, the storage, and the one or more networking resources includes by the landing zone creation module.

The method 300 also includes analyzing storage configuration of a source environment to identify a plurality of parameters; upon applying the one or more security details in step 350. In one embodiment, analyzing storage configuration of a source environment to identify a plurality of parameters; upon applying the one or more security details includes analyzing storage configuration of a source environment to identify a plurality of parameters; upon applying the one or more security details by a storage migration module. In one embodiment, the plurality of parameters may include storage type, one or more performance requirements, and one or more data access patterns.

The method 300 also includes configuring storage of the cloud based on the plurality of parameters to migrate data from the source environment to the cloud in step 360. In one embodiment, configuring storage of the cloud based on the plurality of parameters to migrate data from the source environment to the cloud includes configuring storage of the cloud based on the plurality of parameters to migrate data from the source environment to the cloud, by the storage migration module.

The method 300 also includes mapping one or more network configurations of the source environment to a second network associated with the cloud upon configuring the storage of the cloud in step 370. In one embodiment, mapping one or more network configurations of the source environment to a second network associated with the cloud upon configuring the storage of the cloud includes mapping one or more network configurations of the source environment to a second network associated with the cloud upon configuring the storage of the cloud by a network configuration module.

The method 300 also includes establishing secure communication between the source environment and the cloud upon mapping the one or more network configurations in step 380. In one embodiment, establishing secure communication between the source environment and the cloud upon mapping the one or more network configurations includes establishing secure communication between the source environment and the cloud upon mapping the one or more network configurations, by the network configuration module.

The method 300 also includes analyzing the database migration plan to identify one or more data dependencies upon establishing secure communication in step 390. In one embodiment, analyzing the database migration plan to identify one or more data dependencies upon establishing secure communication includes analyzing the database migration plan to identify one or more data dependencies upon establishing secure communication by a data migration module.

The method 300 also includes generating a data migration plan based on the one or more data dependencies identified and the migration wave plan in step 400. In one embodiment, generating a data migration plan based on the one or more data dependencies identified and the migration wave plan includes generating a data migration plan based on the one or more data dependencies identified and the migration wave plan by the data migration module.

The method 300 also includes transferring the data from the source environment to the cloud based on the data migration plan generated in step 410. In one embodiment, transferring the data from the source environment to the cloud based on the data migration plan generated includes transferring the data from the source environment to the cloud based on the data migration plan generated by the data migration module.

The method 300 also includes identifying one or more second servers and the one or more corresponding configurations of the one or more second servers from the migration wave plan in step 420. In one embodiment, identifying one or more second servers and the one or more corresponding configurations of the one or more second servers from the migration wave plan includes identifying one or more second servers and the one or more corresponding configurations of the one or more second servers from the migration wave plan by the server migration module.

The method 300 also includes creating one or more machine images of the one or more corresponding second servers based on the one or more configurations in step 430. In one embodiment, creating one or more machine images of the one or more corresponding second servers based on the one or more configurations includes creating one or more machine images of the one or more corresponding second servers based on the one or more configurations by the server migration module.

The method 300 also includes migrating the one or more corresponding second servers to the cloud using the one or more machine images created in step 440. In one embodiment, migrating the one or more corresponding second servers to the cloud using the one or more machine images created includes migrating the one or more corresponding second servers to the cloud using the one or more machine images created by the server migration module.

The method 300 also includes identifying one or more dependencies between one or more applications present in the source environment from the migration cutover plan in step 450. In one embodiment, identifying one or more dependencies between one or more applications present in the source environment from the migration cutover plan includes identifying one or more dependencies between one or more applications present in the source environment from the migration cutover plan, by the application migration module.

The method 300 also includes generating a deployment plan for the one or more applications based on the one or more dependencies identified in step 460. In one embodiment, generating a deployment plan for the one or more applications based on the one or more dependencies identified includes generating a deployment plan for the one or more applications based on the one or more dependencies identified by the application migration module.

The method 300 further includes deploying the one or more applications to the cloud based on the deployment plan generated, thereby automating the migration of the one or more resource to the cloud in step 470. In one embodiment, deploying the one or more applications to the cloud based on the deployment plan generated includes deploying the one or more applications to the cloud based on the deployment plan generated by the application migration module.

Various embodiments of the system and method to automate migration of one or more resources to a cloud described above enable various advantages. The data migration module is capable of moving large volumes of data from the source environment to the cloud by ensuring data security, optimizing data transfer, performing data validation, and ensuring data consistency during the migration process. The application migration module is capable of identifying opportunities for optimizing and modernizing the one or more applications during migration. For example, the application migration module may recommend containerization, serverless computing, or any other cloud services that might improve application performance and reduce costs leveraging the existing historical data used on similar migrations of the one or more applications.

The landing zone creation module is capable of ensuring the cloud meets security and compliance requirements. The landing zone creation module analyzes security configurations, identifies vulnerabilities, and recommends best practices for securing the cloud environment. The system is also able to monitor resources and suggest cost-saving opportunities. This can help you optimize your cloud spending over time.

Combination of the landing zone creation module, the storage migration module, the network configuration module, the data migration module and the server migration module are capable of performing tasks associated with migration, such as provisioning resources, configuring networking, and scaling workloads. This can speed up the migration process and reduce the risk of human error. The system is also capable of analyzing the performance and health of the cloud, to identify and troubleshoot issues proactively.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

We claim:

1. A system to automate migration of one or more resources to a cloud comprising:
   a processor; and
   a memory coupled to the processor, wherein the memory comprises a set of program instructions in the form of a plurality of subsystems, configured to be executed by the processor, wherein the plurality of subsystems comprises a processing subsystem hosted on a first server and configured to execute on a first network to control bidirectional communications among a plurality of modules comprising:
      a data acquisition module operatively coupled to an integrated database, wherein the data acquisition module is configured to acquire a plurality of information comprising a migration wave plan, a migration cutover plan, a database migration plan, one or more security details, one or more compliance details, and a data migration plan;
      a landing zone creation module operatively coupled to the data acquisition module, wherein the landing zone creation module is configured to:
         parse the migration wave plan and the migration cutover plan to identify one or more landing zone requirements, and one or more requirements of the cloud;
         allocate one or more virtual machines, storage, and one or more networking resources based on one or more infrastructure requirements derived using the one or more landing zone requirements and the one or more requirements of the cloud;
         apply one or more security details, and one or more compliance details on each of the one or more virtual machines, the storage, and the one or more networking resources upon allocating the one or more virtual machines, the storage, and the one or more networking resources;
      a storage migration module operatively coupled to the landing zone creation module, wherein the storage migration module is configured to:
         analyze storage configuration of a source environment to identify a plurality of parameters, upon applying the one or more security details;
         configure storage of the cloud based on the plurality of parameters to migrate data from the source environment to the cloud;
      a network configuration module operatively coupled to the storage migration module, wherein the network configuration module is configured to:
         map one or more network configurations of the source environment to a second network associated with the cloud upon configuring the storage of the cloud;
         establish secure communication between the source environment and the cloud upon mapping the one or more network configurations;
      a data migration module operatively coupled to the network configuration module, wherein the data migration module is configured to:
         analyze the database migration plan to identify one or more data dependencies upon establishing secure communication;
         generate a data migration plan based on the one or more data dependencies identified and the migration wave plan;
         transfer the data from the source environment to the cloud based on the data migration plan generated;
      a server migration module operatively coupled to the data migration module, wherein the server migration module is configured to:
         identify one or more second servers and one or more corresponding configurations of the one or more second servers from the migration wave plan;
         create one or more machine images of one or more corresponding second servers based on the one or more corresponding configurations;
         migrate the one or more corresponding second servers to the cloud using the one or more machine images created;
      an application migration module operatively coupled to the server migration module, wherein the application migration module is configured to:
         identify one or more dependencies between one or more applications present in the source environment from the migration cutover plan;
         generate a deployment plan for the one or more applications based on the one or more dependencies identified; and deploy the one or more applications to the cloud based on the deployment plan generated, thereby automating the migration of the one or more resource to the cloud.

2. The system as claimed in claim 1, wherein the cloud comprises private cloud, public cloud, and hybrid cloud.

3. The system as claimed in claim 1, wherein the one or more resources comprises the one or more applications, the one or more second servers, and the data.

4. The system as claimed in claim 1, wherein the one or more landing zone requirements comprises one or more application dependencies, one or more performance requirements, one or more security requirements, one or more compliance requirements, one or more scalability requirements, network architecture, one or more identity requirements, one or more access management requirements, one or more monitoring requirements, one or more logging requirements, one or more documentation requirements and one or more compliance reporting requirements.

5. The system as claimed in claim 1, wherein the one or more requirements of the cloud comprises scalability, security, compliance, availability, disaster recovery, performance optimization, data consistency, data synchronization, network connectivity, resource provisioning automation, data mapping, dependency analysis, deployment automation, testing, documentation, and compliance reporting.

6. The system as claimed in claim 1, wherein the one or more infrastructure requirements comprises virtual machines, storage, networking resources, scalability, compliance and security, data migration, cloud region and availability zones, resource allocation policies, documentation, monitoring and logging.

7. The system as claimed in claim 1, wherein the one or more networking resources comprises virtual private cloud, subnet, load balancer, firewall, virtual private network, direct connect, route tables, network security groups, domain name system, content delivery network, public IP addresses, private link, gateway services, network monitoring and logging.

8. The system as claimed in claim 1, wherein the plurality of parameters comprises storage type, one or more performance requirements, and one or more data access patterns.

9. The system as claimed in claim 1, wherein the processing subsystem is configured to execute the plurality of modules parallelly.

10. The system as claimed in claim 1, wherein the first server comprises a cloud-based server.

11. The system as claimed in claim 1, wherein the first server comprises a local server.

12. The system as claimed in claim 1, wherein the first network comprises a local area network.

13. The system as claimed in claim 1, wherein the first network comprises a wide area network.

14. The system as claimed in claim 1, wherein the first network comprises a wired network.

15. The system as claimed in claim 1, wherein the first network comprises a wireless network.

16. The system as claimed in claim 1, wherein the integrated database comprises a structured query language database.

17. The system as claimed in claim 1, wherein the integrated database comprises a non-structured query language database.

18. The system as claimed in claim 1, wherein the integrated database comprises a sequential database.

19. A method to automate migration of one or more resources to a cloud comprising:

acquiring, by a data acquisition module, a plurality of information comprising a migration wave plan, a migration cutover plan, a database migration plan, one or more security details, one or more compliance details, and a data migration plan;

parsing, by a landing zone creation module, the migration wave plan and the migration cutover plan to identify one or more landing zone requirements, and one or more requirements of the cloud;

allocating, by the landing zone creation module, one or more virtual machines, storage, and one or more networking resources based on one or more infrastructure requirements derived using the one or more landing zone requirements and the one or more requirements of the cloud;

applying, by the landing zone creation module, one or more security details, and one or more compliance details on each of the one or more virtual machines, the storage, and the one or more networking resources upon allocating the one or more virtual machines, the storage, and the one or more networking resources;

analyzing, by a storage migration module, storage configuration of a source environment to identify a plurality of parameters, upon applying the one or more security details;

configuring, by the storage migration module, storage of the cloud based on the plurality of parameters to migrate data from the source environment to the cloud;

mapping, by a network configuration module, one or more network configurations of the source environment to a second network associated with the cloud upon configuring the storage of the cloud;

establishing, by the network configuration module, secure communication between the source environment and the cloud upon mapping the one or more network configurations;

analyzing, by a data migration module, the database migration plan to identify one or more data dependencies upon establishing secure communication;

generating, by the data migration module, a data migration plan based on the one or more data dependencies identified and the migration wave plan;

transferring, by the data migration module, the data from the source environment to the cloud based on the data migration plan generated;

identifying, by the server migration module, one or more second servers and one or more corresponding configurations of the one or more second servers from the migration wave plan;

creating, by the server migration module, one or more machine images of one or more corresponding second servers based on the one or more corresponding configurations;

migrating, by the server migration module, the one or more corresponding second servers to the cloud using the one or more machine images created;

identifying, by the application migration module, one or more dependencies between one or more applications present in the source environment from the migration cutover plan;

generating, by the application migration module, a deployment plan for the one or more applications based on the one or more dependencies identified; and deploying, by the application migration module, the one or more applications to the cloud based on the deployment plan generated, thereby automating the migration of the one or more resource to the cloud.

20. A non-transitory computer-readable medium storing a computer program that, when executed by a processor, causes the processor to perform a method to automate migration of one or more resources to a cloud, wherein the method comprises:
- acquiring, by a data acquisition module, a plurality of information comprising a migration wave plan, a migration cutover plan, a database migration plan, one or more security details, one or more compliance details, and a data migration plan;
- parsing, by a landing zone creation module, the migration wave plan and the migration cutover plan to identify one or more landing zone requirements, and one or more requirements of the cloud;
- allocating, by the landing zone creation module, one or more virtual machines, storage, and one or more networking resources based on one or more infrastructure requirements derived using the one or more landing zone requirements and the one or more requirements of the cloud;
- applying, by the landing zone creation module, one or more security details, and one or more compliance details on each of the one or more virtual machines, the storage, and the one or more networking resources upon allocating the one or more virtual machines, the storage, and the one or more networking resources;
- analyzing, by a storage migration module, storage configuration of a source environment to identify a plurality of parameters; upon applying the one or more security details;
- configuring, by the storage migration module, storage of the cloud based on the plurality of parameters to migrate data from the source environment to the cloud;
- mapping, by a network configuration module, one or more network configurations of the source environment to a second network associated with the cloud upon configuring the storage of the cloud;
- establishing, by the network configuration module, secure communication between the source environment and the cloud upon mapping the one or more network configurations;
- analyzing, by a data migration module, the database migration plan to identify one or more data dependencies upon establishing secure communication;
- generating, by the data migration module, a data migration plan based on the one or more data dependencies identified and the migration wave plan;
- transferring, by the data migration module, the data from the source environment to the cloud based on the data migration plan generated;
- identifying, by the server migration module, one or more second servers and one or more corresponding configurations of the one or more second servers from the migration wave plan;
- creating, by the server migration module, one or more machine images of one or more corresponding second servers based on the one or more corresponding configurations;
- migrating, by the server migration module, the one or more corresponding second servers to the cloud using the one or more machine images created;
- identifying, by the application migration module, one or more dependencies between one or more applications present in the source environment from the migration cutover plan;
- generating, by the application migration module, a deployment plan for the one or more applications based on the one or more dependencies identified; and
- deploying, by the application migration module, the one or more applications to the cloud based on the deployment plan generated, thereby automating the migration of the one or more resource to the cloud.

\* \* \* \* \*